US012169527B2

(12) United States Patent
Li et al.

(10) Patent No.: US 12,169,527 B2
(45) Date of Patent: Dec. 17, 2024

(54) APPROXIMATE NEAREST NEIGHBOR SEARCH ENGINE

(71) Applicant: Microsoft Technology Licensing, LLC, Redmond, WA (US)

(72) Inventors: Mingqin Li, Mercer Island, WA (US); Qi Chen, Beijing (CN); Jingdong Wang, Beijing (CN); Zengzhong Li, Bellevue, WA (US); Jeffrey Song Zhu, Seattle, WA (US); Shi Zhang, Bellevue, WA (US); Nilesh N. Yadav, Bellevue, WA (US); Han Zhang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/910,306

(22) Filed: Jun. 24, 2020

(65) Prior Publication Data

US 2021/0406321 A1 Dec. 30, 2021

(51) Int. Cl.
*G06F 16/951* (2019.01)
*G06F 16/22* (2019.01)
*G06F 16/23* (2019.01)
*G06F 16/27* (2019.01)
*G06F 16/953* (2019.01)

(52) U.S. Cl.
CPC ........ *G06F 16/951* (2019.01); *G06F 16/2237* (2019.01); *G06F 16/2379* (2019.01); *G06F 16/27* (2019.01); *G06F 16/953* (2019.01)

(58) Field of Classification Search
None
See application file for complete search history.

(56) References Cited

U.S. PATENT DOCUMENTS

2012/0078859 A1* 3/2012 Vaitheeswaran ...... G06F 16/313
707/693
2013/0219292 A1* 8/2013 Vins ........................ H04W 4/12
715/751

(Continued)

OTHER PUBLICATIONS

Clarke, et al., "Fast Inverted Indexes with On-Line Update", In Technical Report CS-94-40, Department of Computer Science, University of Waterloo, Nov. 23, 1994, 11 Pages.

(Continued)

*Primary Examiner* — Kris E Mackes
*Assistant Examiner* — Soheila (Gina) Davanlou

(57) ABSTRACT

System and methods are directed to operations associated with an approximate nearest neighbor search engine. More specifically, a vector semantically representing content to be added to a search index may be received. The search index may include a neighborhood graph having a plurality of nodes, where each node of the plurality of nodes is associated with content in a content repository. A plurality of nodes within the search index determined to be most semantically similar to the received vector semantically representing content to be added to the search index may be identified. The node corresponding to the received vector semantically representing content to be added to the search index to the search index may be added to the search index and a listing of nearest neighbors associated with each of the of the plurality of nodes may be updated to include an identifier associated with the added node.

17 Claims, 15 Drawing Sheets

(56) References Cited

U.S. PATENT DOCUMENTS

| | | | | |
|---|---|---|---|---|
| 2014/0143536 | A1* | 5/2014 | Holland | H04W 12/122 |
| | | | | 713/153 |
| 2014/0250072 | A1* | 9/2014 | Shtilman | G06F 16/275 |
| | | | | 707/634 |
| 2014/0267287 | A1* | 9/2014 | Dodgen | G06T 11/206 |
| | | | | 345/440 |
| 2015/0039575 | A1* | 2/2015 | Helak | G06F 16/21 |
| | | | | 707/696 |
| 2016/0232157 | A1* | 8/2016 | Mansour | G06K 9/00483 |
| 2018/0268010 | A1* | 9/2018 | Park | G06F 16/211 |
| 2018/0349512 | A1* | 12/2018 | Tian | G06N 3/045 |
| 2019/0034793 | A1 | 1/2019 | Kataria et al. | |
| 2019/0325070 | A1* | 10/2019 | Kov | G06F 16/9535 |

OTHER PUBLICATIONS

Ester, et al., "In-Place versus Re-Build versus Re-Merge: Index Maintenance Strategies for Text Retrieval Systems", In Proceedings of the 27th Australasian Conference on Computer Science, vol. 26, Jan. 1, 2004, pp. 15-23.

Malkov, et al., "Efficient and Robust Approximate Nearest Neighbor Search using Hierarchical Navigable Small World Graphs", In IEEE Transactions on Pattern Analysis and Machine Intelligence, Dec. 28, 2018, 13 Pages.

Ong, et al., "SPTAG: A Library for Fast Approximate Nearest Neighbor Search", Retrieved from: https://web.archive.org/web/20190515171806/https://github.com/microsoft/SPTAG, May 15, 2019, 4 Pages.

Tomasic, et al., "Incremental Updates of Inverted Lists for Text Document Retrieval", In Proceedings of the ACM SIGMOD International Conference on Management of Data, May 24, 1994, pp. 289-300.

Douze, et al., "Faiss", Retrieved from: https://github.com/facebookresearch/faiss, May 13, 2020, 5 Pages.

"Build k-Nearest Neighbor (k-NN) Similarity Search Engine with Amazon Elasticsearch Service", Retrieved from: https://aws.amazon.com/about-aws/whats-new/2020/03/build-k-nearest-neighbor-similarity-search-engine-with-amazon-elasticsearch-service/, Mar. 3, 2020, 3 pages.

"International Search Report and Written Opinion Issued in PCT Application No. PCT/US21/032123", Mailed Date: Aug. 2, 2021, 12 Pages.

* cited by examiner

APPROXIMATE NEAREST NEIGHBOR SEARCH ENGINE

BACKGROUND

Added content is difficult to find. To address the difficulty of finding content, an approximate nearest neighbor search algorithm may be utilized. To use an approximate nearest neighbor search algorithm, a machine learning model may generate a vector representation of the content to be added; the vector representation of the content may then be compared to other vectors representing other content to determine a distance, or similarity, between vectors. The more similar the vectors, the more similar the content. Accordingly, a vector representation of a search term may be similar to or otherwise related to vectors representing content in a content store and the content represented by the related vectors may be retrieved and provided to a searcher. However, utilizing distances between vectors to determine vector similarities is not user friendly or immediately straightforward for users when searching for content. Accordingly, vectors representing content in a content repository may be arranged in a search index, where each vector may include a list of nearest vectors.

Utilizing a search index, semantically related vectors may be identified based on vectors being similar to one another. However, building such a search index requires computing resources such as computer cycles and memory. Moreover, such an index may be require a certain amount of time to complete. Thus, new content added to a content repository will not be available for immediate retrieval because the new content will first need to be converted into a vector representation and then a new index will need to be built that includes the new vector representation. Accordingly, results retrieved from a search index may represent stale results and will not include content yet to be vectorized and included in a new search index. For example, a search for the latest news or a current event may return results that are from the previous day, week, or month. Therefore, new methods and systems designed to utilize approximate nearest neighbor search algorithms and provide results available immediately within adding the content to a content repository is needed.

SUMMARY

In accordance with examples of the present disclosure, methods and systems are provided that provide the ability for a document added to a content repository to be immediately searchable utilizing an approximate nearest neighbor search algorithm. That is, an approximate nearest neighbor search algorithm may rely on a prebuilt search index including a neighborhood graph comprised of nodes representing vectorized content. When a new document is to be added to the search index, the node associated with the new document may be inserted into the search index as if the node was originally present during the initial indexing operation. Accordingly, newly added documents may be available to a search algorithm within a very short amount of time from when they were added to the content repository. In some examples, if a node is to be deleted—that is if content is to be removed from the content repository, rather than removing the node from the search index, an indication that the node is to be deleted is added to the node such that if the node is included in search results, the to be deleted node may be filtered out and will not be presented to the requesting entity.

In accordance with examples of the present disclosure, a method for adding a vector that semantically represents content to a search index is provided. The method includes receiving a vector semantically representing content to be added to a search index, identifying a plurality of nodes within the search index determined to be most semantically similar to the received vector, adding a node corresponding to the received vector to the search index, and updating a listing of nearest neighbors associated with each of the of the plurality of nodes to include an identifier associated with the added node.

In accordance with examples of the present disclosure, a system for adding a vector that semantically represents content to a search index is provided. The system may include a processor and memory. The memory may include one or more instructions, which when executed by the processor, cause the processor to receive, at a primary content area including a plurality of vectors semantically representing content in a content repository, a vector semantically representing content to be added to a search index within a primary search index area, the search index including a neighborhood graph having a plurality of nodes, each node of the plurality of nodes associated with content in the content repository. The one or more instructions, which when executed by the processor, may cause the processor to receive, at the search index area, a node associated with the vector semantically representing content to be added to the search index within the primary search index area. The one or more instructions, which when executed by the processor, may cause the processor to identify a plurality of nodes within the search index determined to be most semantically similar to the received vector semantically representing content to be added to the search index. The one or more instructions, which when executed by the processor, may cause the processor to add a node corresponding to the received vector semantically representing content to be added to the search index to the search index. The one or more instructions, which when executed by the processor, may cause the processor to update a listing of nearest neighbors associated with each of the of the plurality of nodes to include an identifier associated with the added node.

In accordance with examples of the present disclosure, a computer-readable medium is provided. The computer-readable medium may include instructions, which when executed by a processor, cause the processor to receive content, generate a vector semantically representing the received content, locate a plurality of nodes within a neighborhood graph, and update a listing of nearest neighbors associated with each of the plurality of nodes to include an identifier of a node in the neighborhood graph that is associated with the vector semantically representing the received content.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
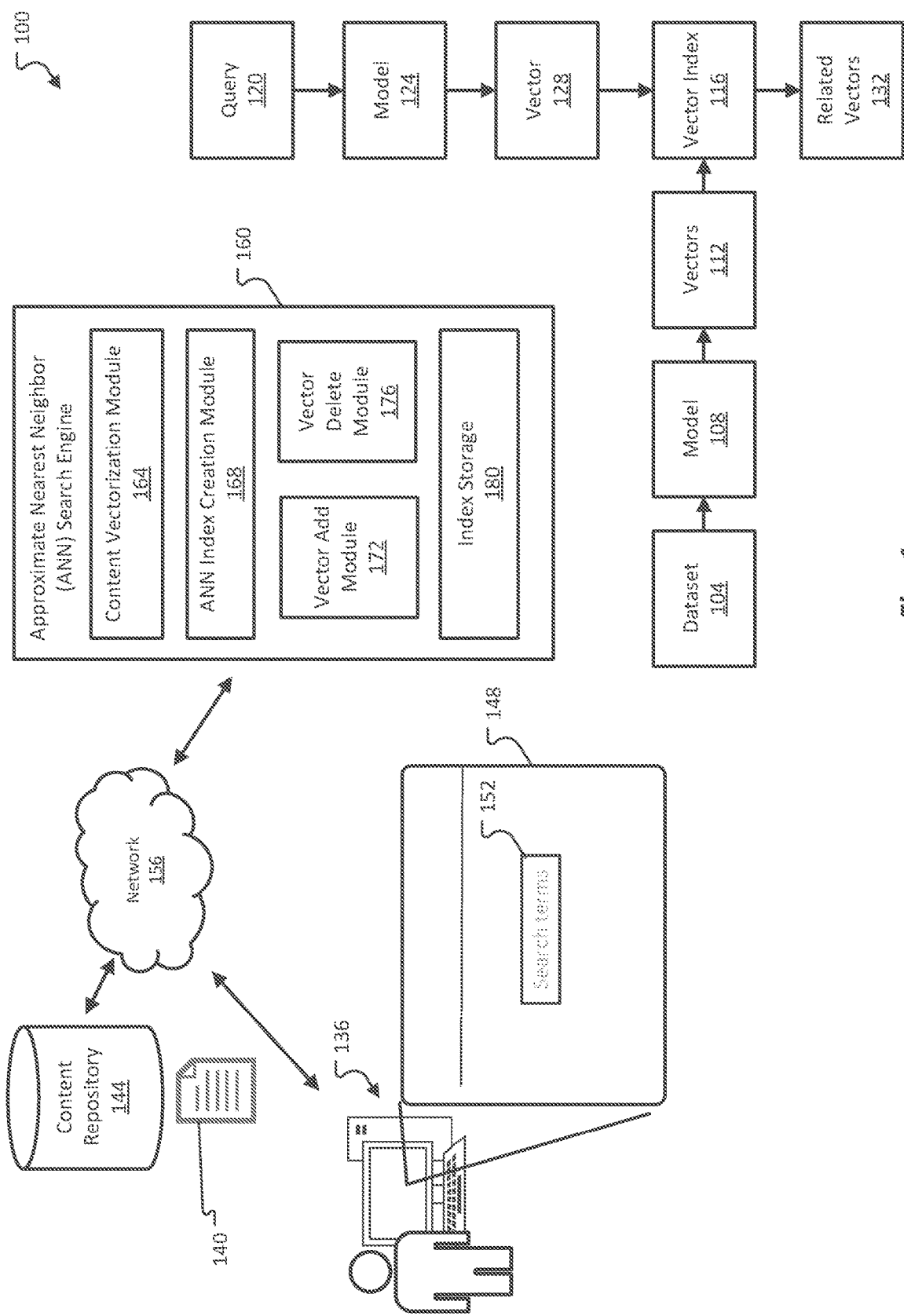
FIG. 1 depicts details of an approximate nearest neighbor search engine in accordance with examples of the present disclosure.

FIG. 1 depicts details of an approximate nearest neighbor search system 100 in accordance with examples of the present disclosure. An approximate nearest neighbor search system 100 may operate by making a dataset, such as dataset 104, searchable. To do so, a deep learning model 108 may be applied to a dataset 104 and one or more vectors 112 may be generated. The one or more vectors 112 may semantically represent one or more portions of the dataset 104. For example, the dataset 104 may include a plurality of web pages, documents, and/or images, where a deep learning model may be applied to each of the web pages, documents, and/or images to generate associated vectors 112. The vectors may then be arranged or otherwise stored in a logical matter within an index or neighborhood graph, where each vector may be represented as a node. Each node may include a nearest neighbor list indicating which vectors or nodes, as identified by a node identifier, are the closest. In examples, nodes that are close may be most similar. Accordingly, a user or system desiring to query the dataset 104 for content most similar to a query 120, may provide content, such as a keyword, image, or other information in a user interface. A deep learning model 124, similar to or the same as the deep learning model 108, may then be applied to the query to generate a vector 128 that is semantically representative of the query. Accordingly, the vector index 116 may be searched utilizing the generated vector 128 to identify other related vectors 132 within the vector index 116 that are most semantically similar to the generated vector 128. Accordingly, content associated with the most similar vectors may be located and provided to a user or system.

As further depicted in FIG. 1, a user utilizing a computing device 136 for example, may desire to add a document 140 to a content repository 144 and make the document 140 searchable within the content repository 144. For example, a user interface 148 including one or more areas to specify a search term or keyword 152 may be provided to the display of the computing device 136. The user may enter keywords 152 into the user interface 148; the keywords 152 may be provided to the approximate nearest neighbor (ANN) search engine 160 via the network 156, where the ANN search engine 160 may locate documents most semantically similar to the keywords provided in the query 120 and provide the documents, or a representation of the documents, to the computing device 136.

In examples, the ANN search engine 160 may receive content from the content repository 144 and generate one or more vector indexes for searching. The ANN search engine 160 may include a content vectorization module 164 to apply a deep learning model to one or more portions of the content repository 144 and generate a vector index utilizing the ANN index creation module 168. The ANN index creation module 168 may utilize one or more ANN algorithms, such as SPTAG or HSW. The index may be stored in the index storage 180. If the user were to add a document to the content repository 144, the ANN search engine 160 may generate a vector semantically representing the content and add the vector to the existing index utilizing the Vector Add module 172. Similarly, if content is to be deleted or removed from the existing index, the ANN search engine 160 may remove the vector utilizing the vector delete module 176.

Figure 2:
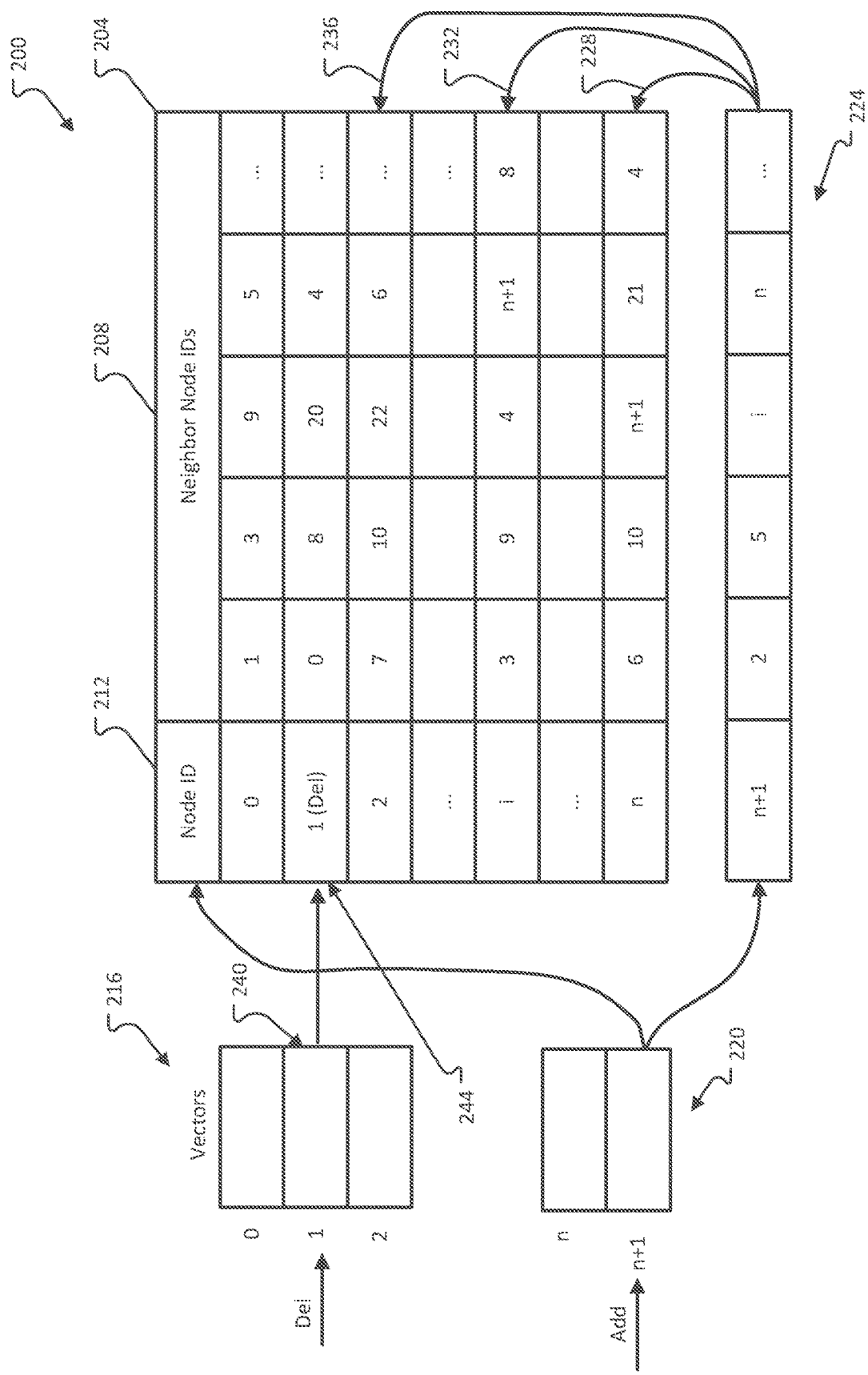
FIG. 2 depicts additional details directed to a node add and/or delete operation to an ANN index in accordance with examples of the present disclosure.

FIG. 2 depicts additional details directed to adding and/or removing a node to a neighborhood graph. To support an add operation, the graph-based ANN algorithm may provide the ability to insert a node into a neighborhood graph. To insert the node into the neighborhood graph, a search the node to be inserted top-k nearest neighbors is searched in the current index. Then, one edges in the graph may be built out according to the top-k nearest neighbors; the node may be inserted it into the neighbors of the top-k nearest nodes. Utilizing such an approach, a fine-grained lock may be applied during the node insertion and/or updating process affecting the specific graph node. Accordingly, the index is almost lock free and can be searched during the index update process.

Turning to FIG. 2, one or more pieces of content, or a document for example, may be represented in vector form. For example, a deep learning model may be applied to one or more pieces of content in a content repository to generate vector representations 216 of the pieces of content. If a new node n+1 220 is to be added to an existing index including the neighborhood graph 204, a search against the existing neighborhood graph 204 would be conducted to find the top-k nearest neighbors for the new node n+1 220. For example, the top-k nearest neighbors for the new node n+1 220 may be nodes with node identifiers of 2 (236), i (232), and n (228). A new edge, for example new edge including node 224, may then be added to the neighborhood graph 204 according to the top-k nearest neighbors for the new node n+1 220. One or more of the identified top-k nearest neighbors of the newly added node n+1 220 may be updated to include the n+1 220 node in the nearest neighbors list. That is, the node n+1 220 may be inserted into the node 228; the node n+1 220 may be inserted into the node 232, and the node n+1 220 may be inserted into the node 236. When a vector, or node, is added to the existing index such as the neighborhood graph 204, the top-k nearest neighbors may be the only nodes that are affected during the add operation. Accordingly, during the update operation, the nodes identified as being the top-k nearest neighbors (e.g., neighborhood list) may be locked while the rest of the entire index remains searchable. Accordingly, the whole graph remains searchable and has a minimal impact to the overall search latency.

In some instances, the top-k nearest neighbors for the new node n+1 220 may be updated based on a calculated closeness of the new node n+1 220 to one or more of the top-k nearest neighbors. For example, a distance function may be utilized to determine which neighbors are closest. In some examples, one or more rules may be applied to determine one or more nearest neighbors to update and/or pair down the list of top-k nearest neighbors in a logical manner. For example, if a first neighbor can be searched from a second neighbor, the first neighbor may be removed from the top-k nearest neighbors.

If a node is to be deleted from the index, a tombstone label may be added in front of the node which prevents the node from appearing in the search results of subsequent queries but still allows the node to maintain its connection to other nodes. Accordingly, the deleted nodes still exist in the index. When the number of deleted nodes exceeds a threshold, a fine tune process applied to the index may be implemented in the background to maintain the search quality of the index. Turing back to FIG. 2, if a vector 240 corresponding to node 1 244 is to be deleted, rather than removing node 1 244 from the neighborhood graph 204, which may affect the structure and integrity of the neighborhood graph 204, a tombstone indicating that node 1 244 is to be deleted is added to a portion of node. For example, a tombstone (Del) may be added to a location in front of the node. Accordingly, if node 1 244 is returned as a result from a new query search, such as a result in the top ten results, node 1 244 would be filtered out and prevented from being provided or otherwise displayed to a user. In instances when a node is added, nodes having a tombstone may be updated; for example, if node 244 included a tombstone indicating that it had been deleted, and node 224 were to be inserted into the neighborhood graph 204, if node 224 were to determine that node 244 is a nearest neighbor, the nearest neighbors list for node 244 may be updated with node 224 for example. During an update operation, the nodes in the index, or neighborhood graph, are locked for updated; accordingly, the rest of the entire index remains searchable.

Figure 3:
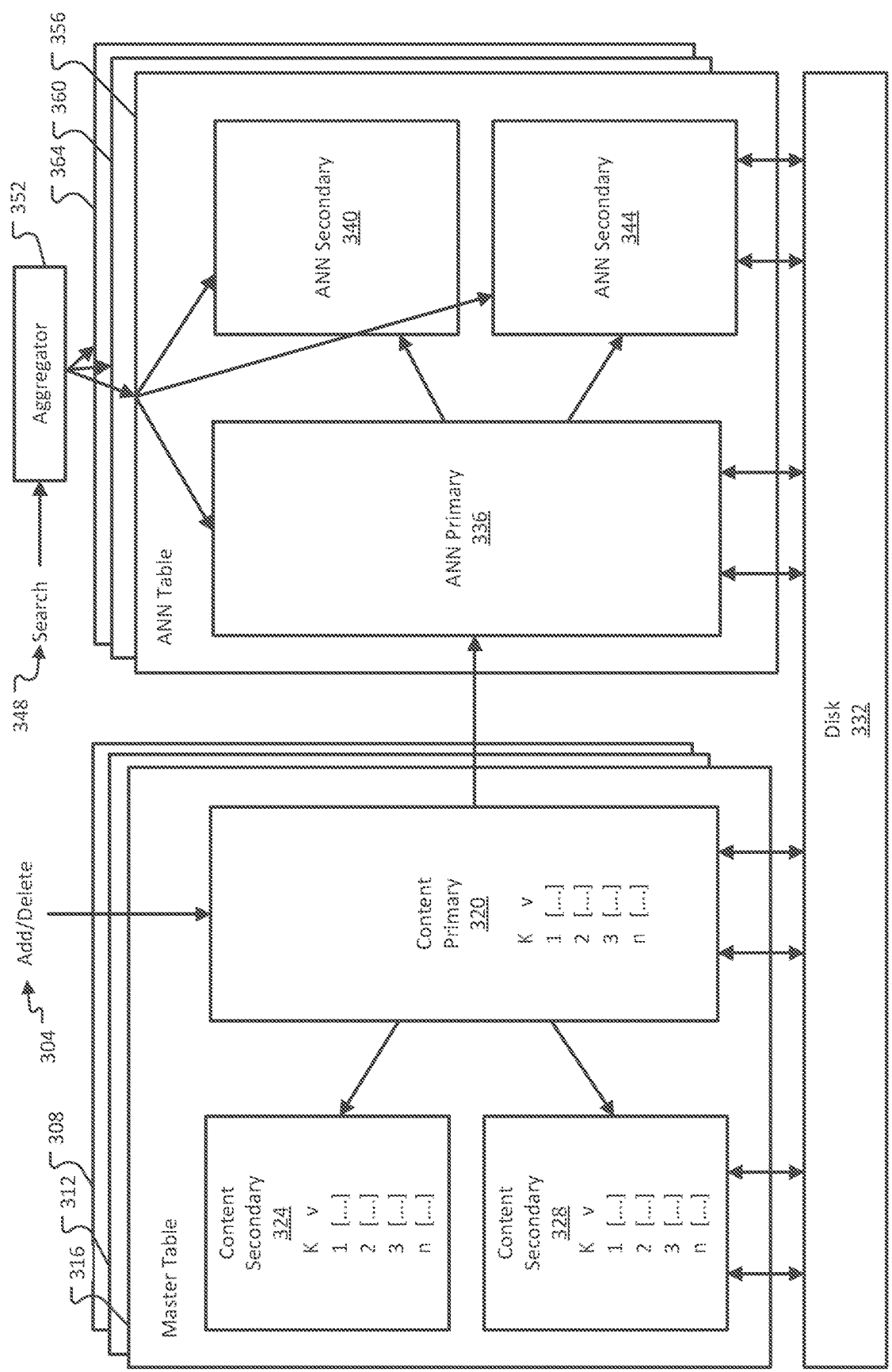
FIG. 3 depicts an example system architecture of an ANN search engine supporting vector add and delete operations in accordance with examples of the present disclosure.

FIG. 3 depicts additional details of an approximate nearest neighbor search system in accordance with examples of the present disclosure. More specifically, vectors may be partitioned into multiple indexes according to a key hash. For example, a hash key may correspond to one or more indexes distributed across one or more shards. During a vector update (add/delete) operation, the request to update (either add/delete) may go to a specific index based on the key hash. For a searching operation, the request may be routed to all partitions in order to retrieve the top N results from each partition and then aggregate the results.

Multiple replicas of an approximate nearest neighbor index may be provided in order to provide a high service of availability. For example, one replica may be primary, and the others are secondary. During a vector update (add/delete) scenario, the vector may be copied from primary to secondary replicas. If data in an ANN index is lost, for example resulting from a hardware crash, one replica, ANN index file copy may support a fast recovery between vector index replicas.

A master table may be created to store ground truth vectors and their metadata, e.g. the actual content, web document, document, image, video etc. If data in ANN index is lost or the ANN index replicas become unavailable, a full new ANN index can be rebuilt from the vectors in master table. The master table is a normal incremental updatable key-value store. Its design is decoupled from the ANN table design and may be implemented utilizing one or more database structures.

Turning specifically to FIG. 3, raw content in vector format may reside in the content primary area 320. The content primary area 320 may include a vector identifier K and the corresponding vector v. When an add or delete operation 304 occurs, the raw content in vector format may be added to the content primary area 320 or deleted form the content primary area 320. For matters of durability and high availability, during an add operation, the raw content in vector format may be replicated to the content secondary area 324 and content secondary area 328. Similarly, if content is deleted, the deletion of the vector content may occur at the content secondary area 324 and content secondary area 328. The raw vector content may be stored to the disk 332 and may be organized into one or more shards 308, 312, and/or 316 for example. Accordingly, the content primary area 320, content secondary area 324, and content secondary area 328 may provide ground truth vectors and their metadata, e.g. the actual content, web document, document, image, video etc. in order to rebuild an ANN index if needed.

Similar to the master table organized in one or more shards 308, 312, and/or 316, the ANN table, may be distributed across one or more shards, such as shards 356, 360, and/or 364. An ANN primary area 336 may receive a vector from the content primary area 320. The ANN primary area 336 may be updated (e.g., a vector may be added or deleted as previously described) and the update may be copied, or applied to, the ANN secondary areas 340 and/or 344 for example. For example, an operation replication may cause the operation (add/delete operation) applied to the ANN primary area 336 to be performed or applied to the ANN secondary areas 340 and/or 344. As another example, data replication may be utilized to replicate the change applied to the ANN primary area 336; that is, only the change, or the delta incurred due to an update at the ANN primary area 336 may be applied to the ANN secondary areas 340 and/or 344. Thus, the ANN index in the ANN secondary areas 340 and/or 344 just need to apply the delta and generate the new index. Accordingly, when a search is executed, the search may be executed utilizing a randomly selected ANN index, such as the index in the ANN primary area 336, ANN secondary area 340, and/or ANN secondary area 344.

In some examples, a replication sequence number, such as a continuous integer, may be assigned to each update operation (such as an add or delete operation). That is, both the master table and the ANN table may store a latest RSNs in memory. The RSN associated with the master table and the RSN associated with the ANN table may be different. The ANN table may receive the master table's RSN via replication, and persist the pair of RNS, one for master table and one for ANN table. Accordingly, to ensure data consistency, the update operation may be committed only when all the previous (smaller RSN) operators have been previously committed into the ANN table or index.

In order to maintain high data durability, availability, and/or resiliency, the ANN index, such as the ANN index in the ANN primary area 336 is dumped, or otherwise stored, to a disk, such as disk 332. The index dump may be scheduled and/or may occur as a background process according to a regular schedule (e.g., normally several minutes) and/or according to an index size. Accordingly, the ANN index may be recovered if the ANN index in memory is lost due to a service restart or machine failure for example. Accordingly, utilizing an RSN, a latest in-memory RSN may be obtained, the vector index dump may be performed, and the in-memory RSN may be stored to disk. Such operations may ensure consistency between the RSN and the index dump.

Figure 4A:
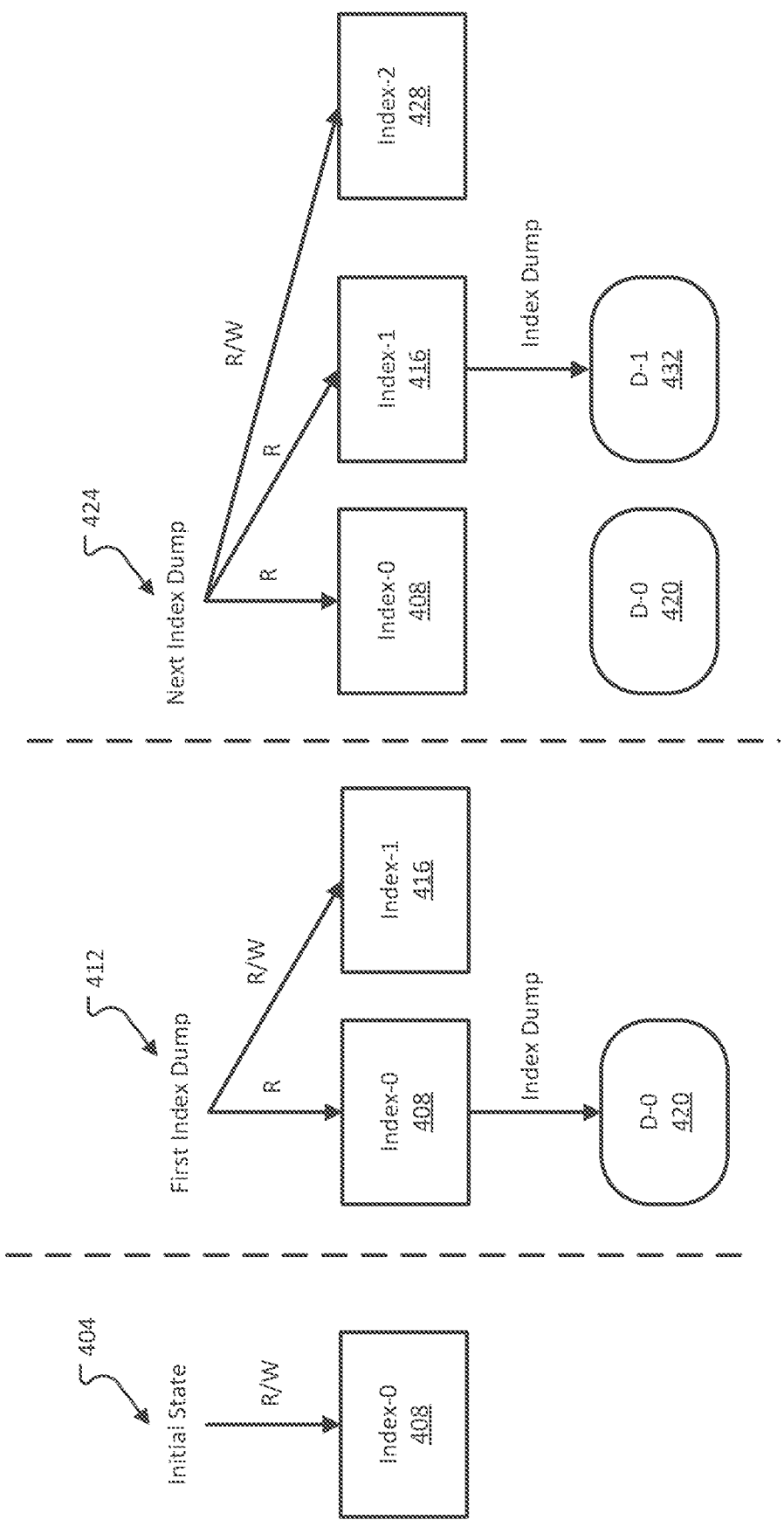
FIG. 4A depicts details associated with storing one or more indexes to a disk in accordance with examples of the present disclosure.
Figure 4B:
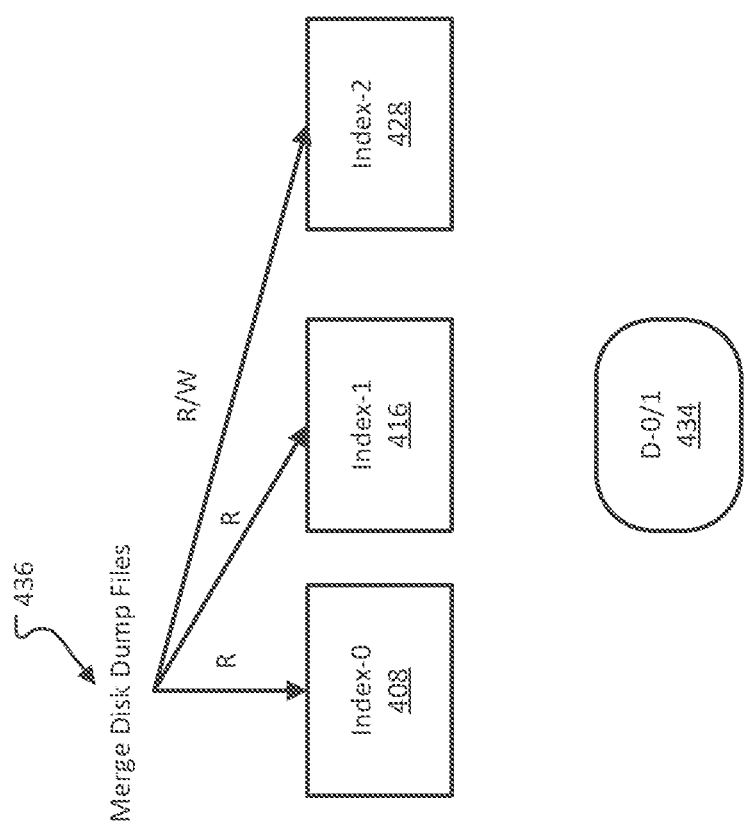
FIG. 4B depicts additional details associated with storing one or more indexes to a disk in accordance with examples of the present disclosure.

Turning to FIGS. 4A-4D, the system of FIG. 3 may include multiple indexes corresponding to information in a vector format. For example, as updates are applied to the ANN index, the index may be stored to disk and/or may be merged to provide an updated index. By storing the index to disk and/or merging stored indexes, more efficient searching may be realized, either due in part to memory utilization, speed of access, and/or accuracy of results. As depicted in FIG. 4A, at a starting or an initial state 404, the Index-0 408 may be available for read and write access, where the Index-0 408 may be stored in memory, partially stored in memory, and/or partially stored on disk, such as disk 332. Accordingly, an update (e.g., add or delete operation) may occur (corresponding to write access) and a search may be performed (corresponding to read access) against the Index-0 408. According to a predetermined event, such as the passage of time or an increase in index size, the first index may be dumped to disk at state 412. The Index-0 may be marked as read only such that the Index-0 408 may be available to be searched against (e.g., vector searching) but new vectors cannot be added. That is, the Index-0 408 may be utilized for searching but cannot be updated. The Index-0 408 may be stored to disk as D-0 420. A second index Index-1 416 may be created and marked as read and write. Accordingly, update operations (e.g., add and/or delete operations) may be performed against Index-1 416, as Index-1 416 may be marked as read and write.

According to another predetermined event, such as the passage of time or an increase in index size, the Index-1 416 may be dumped to disk as D-01 432 at a state 424. Accordingly, Index-0 408 and Index-1 416 may be marked as read and a new index, Index-2 428 may be created and marked as read and write. Thus, for an update operation, the Index-2 428 may be updated (e.g., a vector may be added or deleted), while for a search, the Index-0 408, Index-1 416, and Index-2 428 may be searched and the result may be aggregated.

Figure 4C:
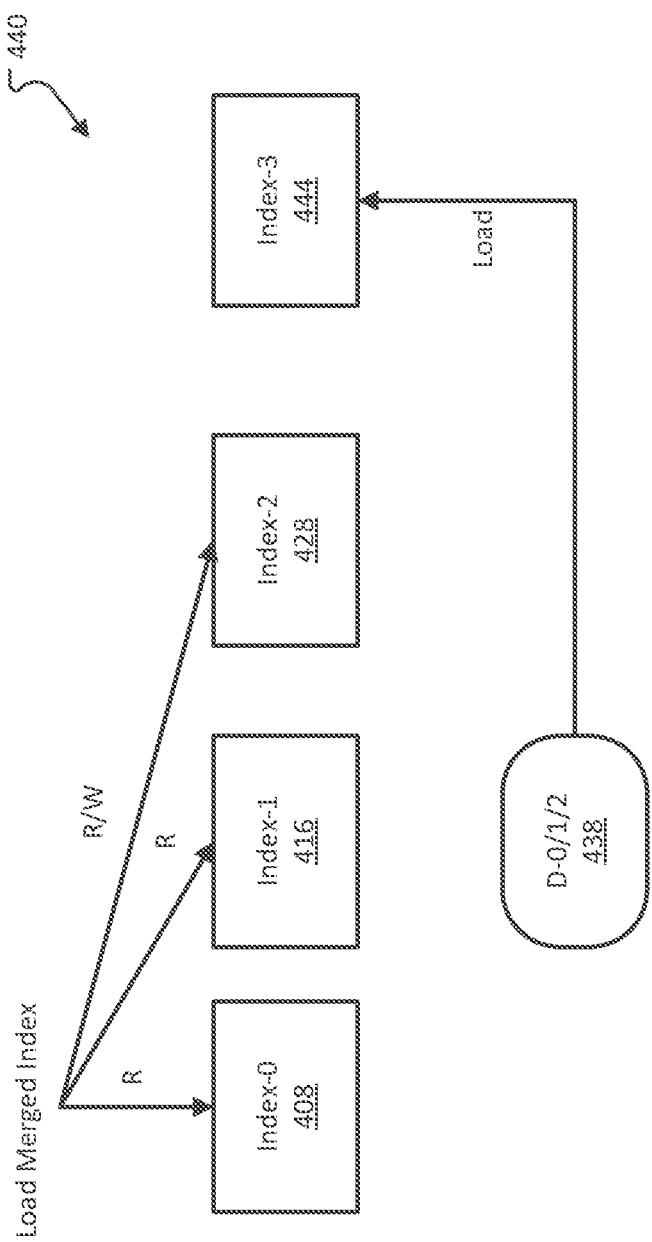
FIG. 4C depicts additional details associated with loading one or more indexes from a disk in accordance with examples of the present disclosure.
Figure 4D:
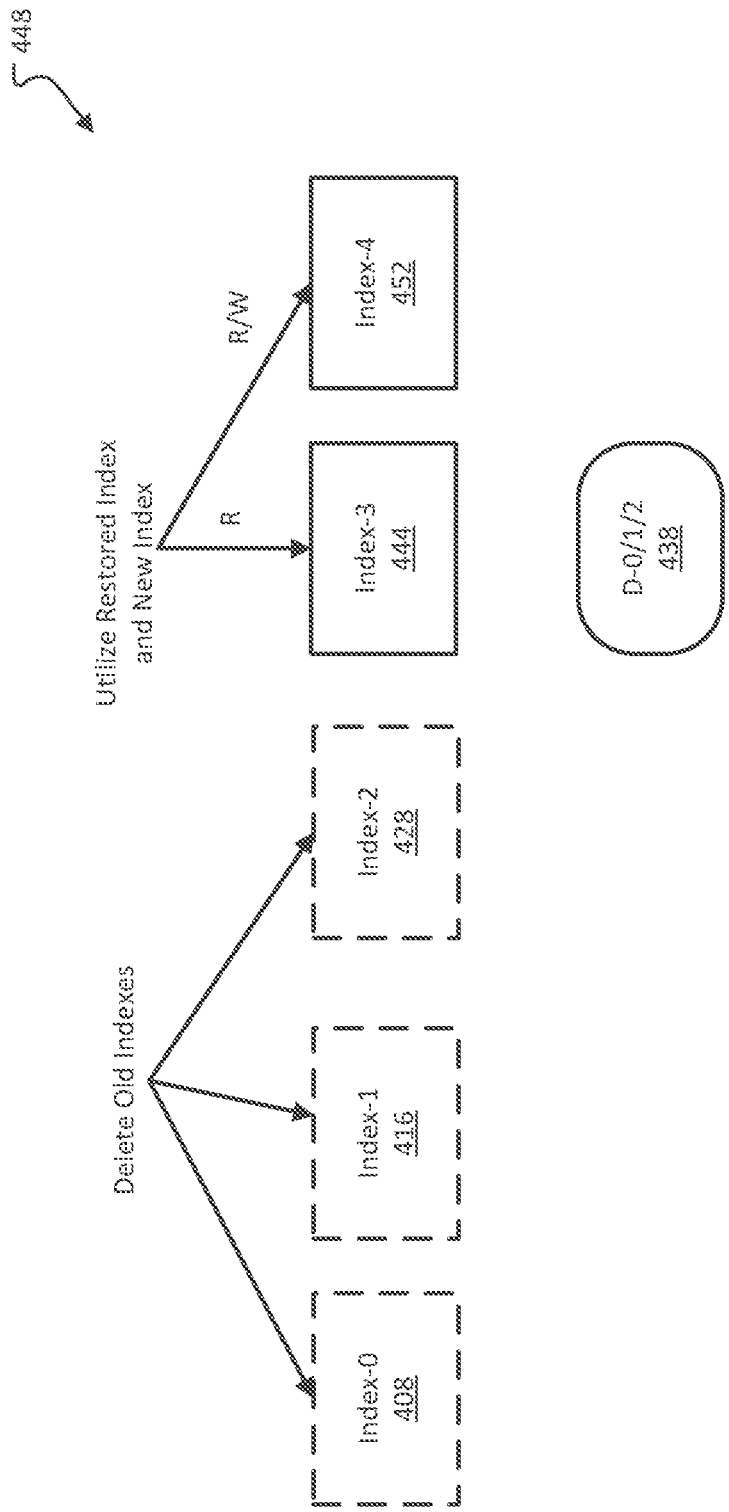
FIG. 4D depicts additional details associated with removing previously used indexes and using a restored index and a new index in accordance with examples of the present disclosure.

Because there is an increase in cost (e.g., memory, cycles to search multiple indexes, etc.), according to another predetermined event, such as the passage of time or an increase in index size, the read only indexes may be merged into a single index at state 436. For example, indexes D-0 420 and D-1 432 may be merged resulting in index D-0/1 434. Index D-0/1 434 may be stored to disk. During the index merge, the ANN algorithm may iterate the vectors of Index-1 416 and add them into the Index-0 408. Vectors deleted in the Index-1 416 may be skipped. As described in delete operation, if the number of deleted vectors in Index-0 408 exceeds a threshold such that the ANN recall quality is impacted, a full index fine tune process may be scheduled and performed as described later. Accordingly, at state 440, when the merged index is ready, the system may load the merged index D-0/1/2 438 as the new read index, as depicted in FIG. 4C. That is, the Index D-0/1/2 438 may utilized to replace the Index D-0 420, D-1 432, and Index-2 428 for example. A new Index-3 444 may be created as read only index after loading the Index D-0/1/2 438. As depicted in FIG. 4D, the Index-4 452 may be created as a read/write index such that searches may be initiated against Index-3 444 and Index-4 452, where in the Index-4 452 may be utilized for add/remove operations. Duplicate indexes, (Index-0 408, Index-1 416, and Index-2 428) may be removed or otherwise deleted from memory.

In accordance with examples of the present disclosure, after multiple add and delete operations, and/or merge operations, the ANN index may undergo a fine-tuning process. The fine-tuning process may correspond to a rebuild process of the entire ANN index. In other examples, the whole index for the existing nodes. The fine-tuning process may rebuild the space partition tree for the existing nodes directly and fine-tune the graph by searching top-k nearest neighbors of each existing node in the index and rebuilding its neighbors to remove any deleted nodes from the graph. Compared to rebuilding the graph from scratch, the fine-tuned graph will save on computation cost; that is, fine-tuning the graph will generally require less computational costs than rebuilding the graph from scratch.

Figure 5A:
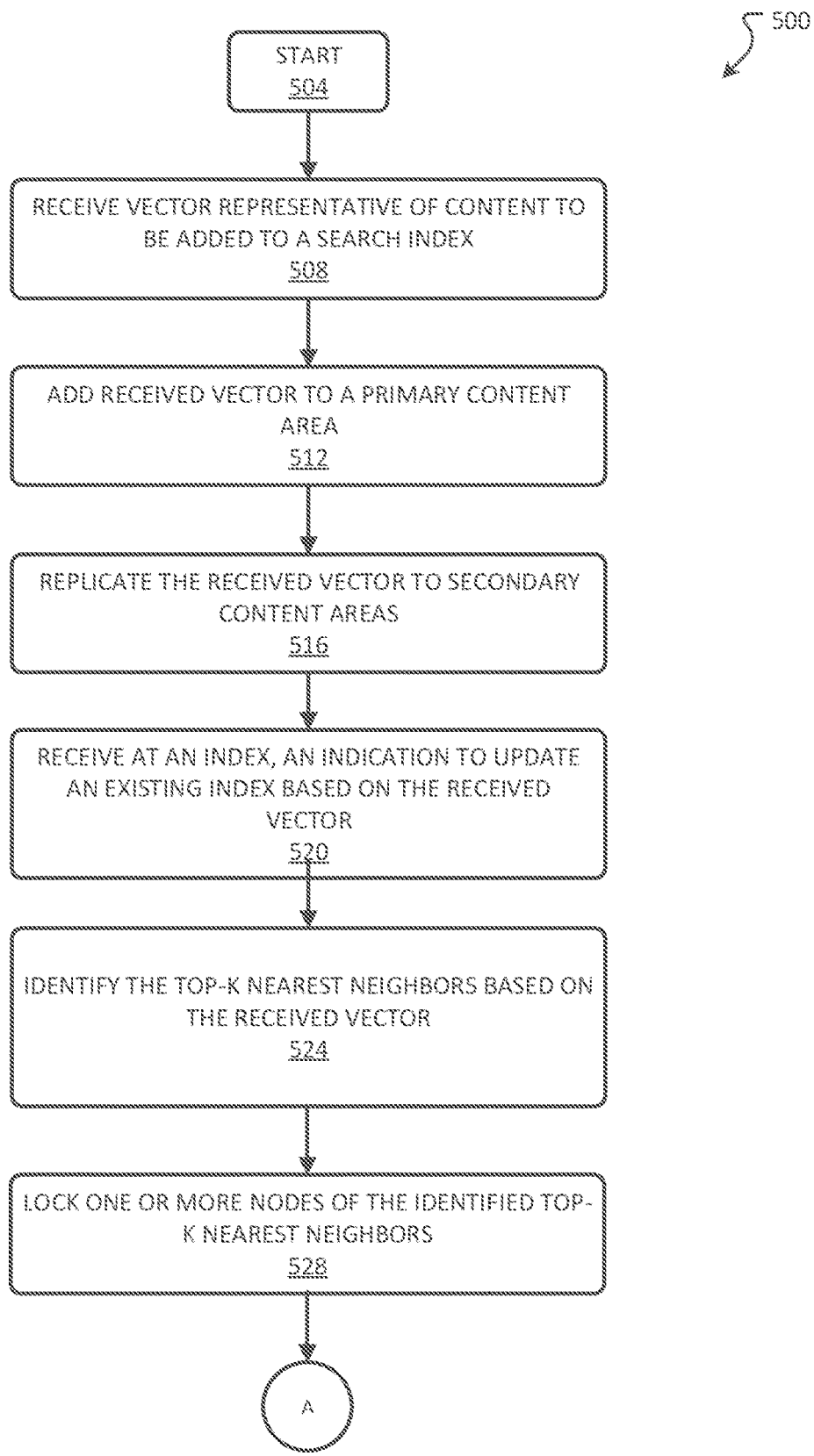
FIG. 5A depicts a first flow chart in accordance with examples of the present disclosure.
Figure 5B:
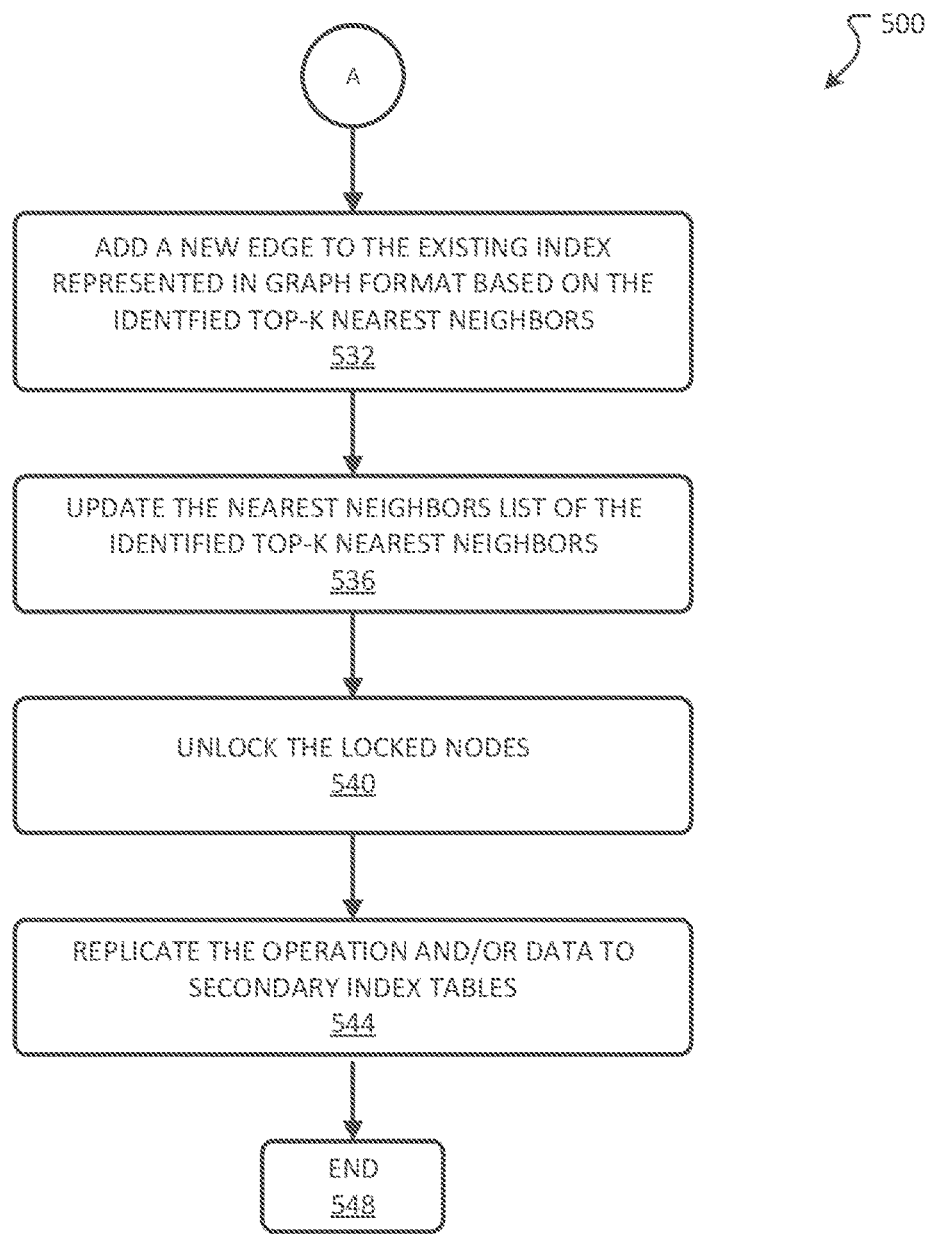
FIG. 5B depicts additional details of the first flow chart in accordance with examples of the present disclosure.

FIGS. 5A-5B depict details of a method 500 for adding content to an index in accordance with examples of the present disclosure. A general order for the steps of the method 500 is shown in FIGS. 5A-5B. Generally, the method 500 starts at 504 and ends at 548. The method 500 may include more or fewer steps or may arrange the order of the steps differently than those shown in FIGS. 5A-5B. The method 500 can be executed as a set of computer-executable instructions executed by a computer system and encoded or stored on a computer readable medium. Further, the method 500 can be performed by gates or circuits associated with a processor, Application Specific Integrated Circuit (ASIC), a field programmable gate array (FPGA), a system on chip (SOC), or other hardware device. Hereinafter, the method 500 shall be explained with reference to the systems, components, modules, software, data structures, user interfaces, etc. described in conjunction with FIGS. 1-4B.

The method starts at 504, where flow may proceed to 508. At 508, a vector representative of content to be added to a search index may be received. For example, the vector may correspond to results of a deep learning model operating on content, where the content may be a web page, a document, an image, etc. At 512, the vector may be added to a primary content area, such as the content primary area 320 previously described. At 516, the vector may replicated to secondary content areas, such as the content secondary areas 324 and 328 for example. At 520, an indication to update an existing index based on the received vector may be received. For example, the vector may be received at a primary search index, such as an approximate nearest neighbor (ANN) search index. The ANN search index may be a graph format identifying neighborhood nodes, such as the neighborhood graph 204 of FIG. 2. Accordingly, at 524, the top-k results, where k may be an integer, may be located. For example, a search operation identifying the closest, or nearest nodes to the vector may be located. In some instances, the closest, or nearest nodes may be the most similar nodes to the vector.

At 528, one or more of the identified top-k nearest nodes may be locked; in some instances, the locking of the nodes prevents the nodes from being returned in one or more search results. At 532, a new edge may be added to the existing graph. For example, the new edge may include or otherwise identify the top-k nearest neighbors. At 536, the nearest neighbors list of the identified top-k nearest neighbors may be updated to reflect the addition of the new node. That is, the new node, or edge, may be added to the nearest neighbors list of the identified top-k nearest neighbors. At 540, the one or more nodes that were locked may be unlocked. At 544, the operation and/or the data may be replicated to the secondary index areas, such as the ANN secondary areas 340 and 344. As previously described, the operation (e.g., the addition of the new node) may be performed at the ANN secondary areas 340 and 344; alternatively, or in addition, a change in data (such as the delta generated at the ANN primary area 336) may be applied to one or more of the ANN secondary areas 340 and 344. The method 500 may end at 548.

Figure 6:
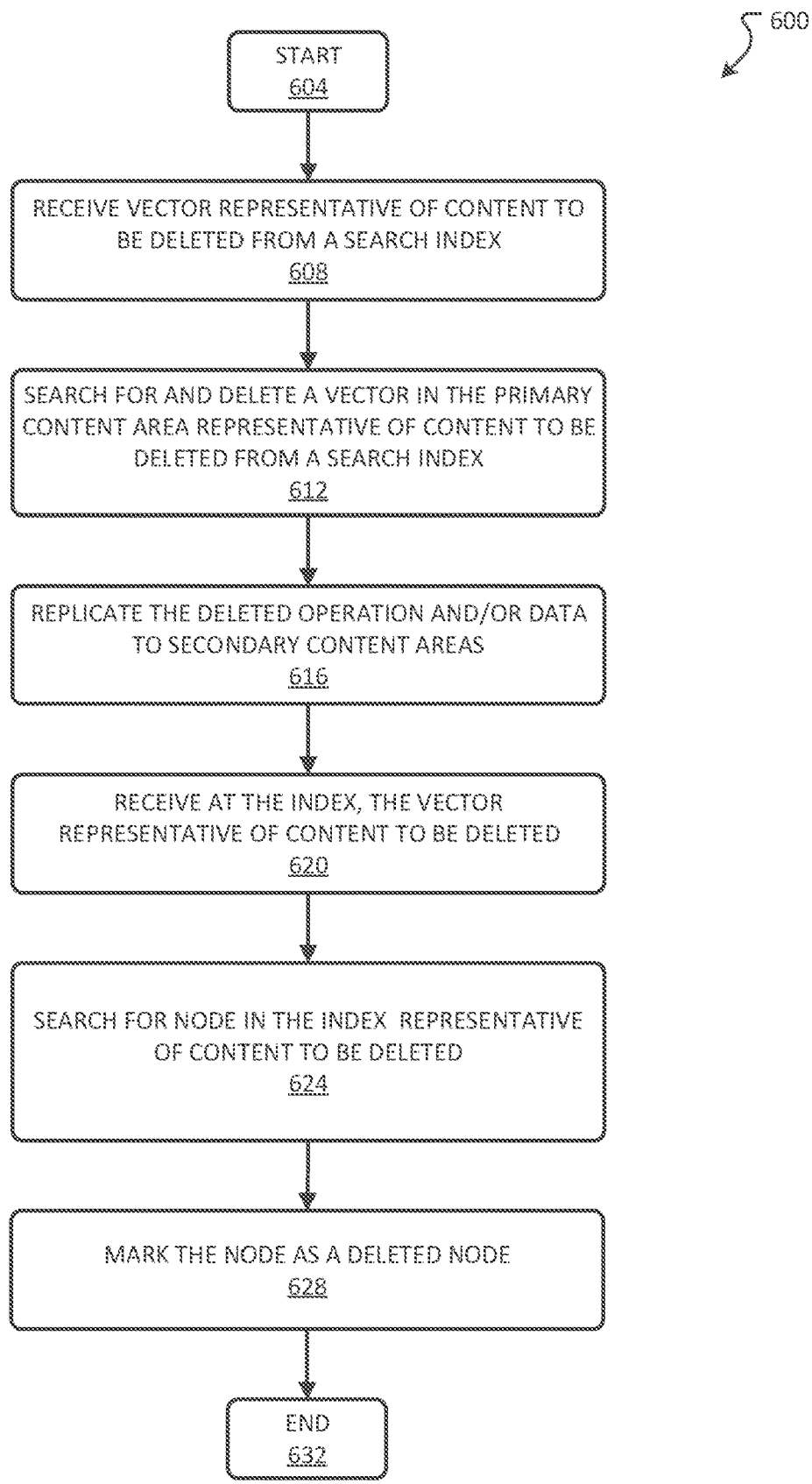
FIG. 6 depicts a second flow chart in accordance with examples of the present disclosure.

FIG. 6 depicts details of a method 600 for identifying and marking a node as deleted in a search index in accordance with examples of the present disclosure. A general order for the steps of the method 600 is shown in FIG. 6. Generally, the method 600 starts at 604 and ends at 632. The method 600 may include more or fewer steps or may arrange the order of the steps differently than those shown in FIGS. 6A-6B. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5B.

The method starts at 604, where flow may proceed to 608. A vector representative of content to be deleted from a search index may be received at a content primary area, such as the content primary area 320. At 612, the vector may be located in the primary content area and may be deleted from the primary content area. At 616, the deletion of the vector may be replicated to the secondary content areas. At 620, an indication to delete a vector, or node, from a search index may be received. In some instances, an identifier of the node may be received. At 624, the node in the search index corresponding to the identifier may be located, and at 628 marked for deletion. For example, a tombstone may be added to the node. The method 600 may end at 632.

Figure 7:
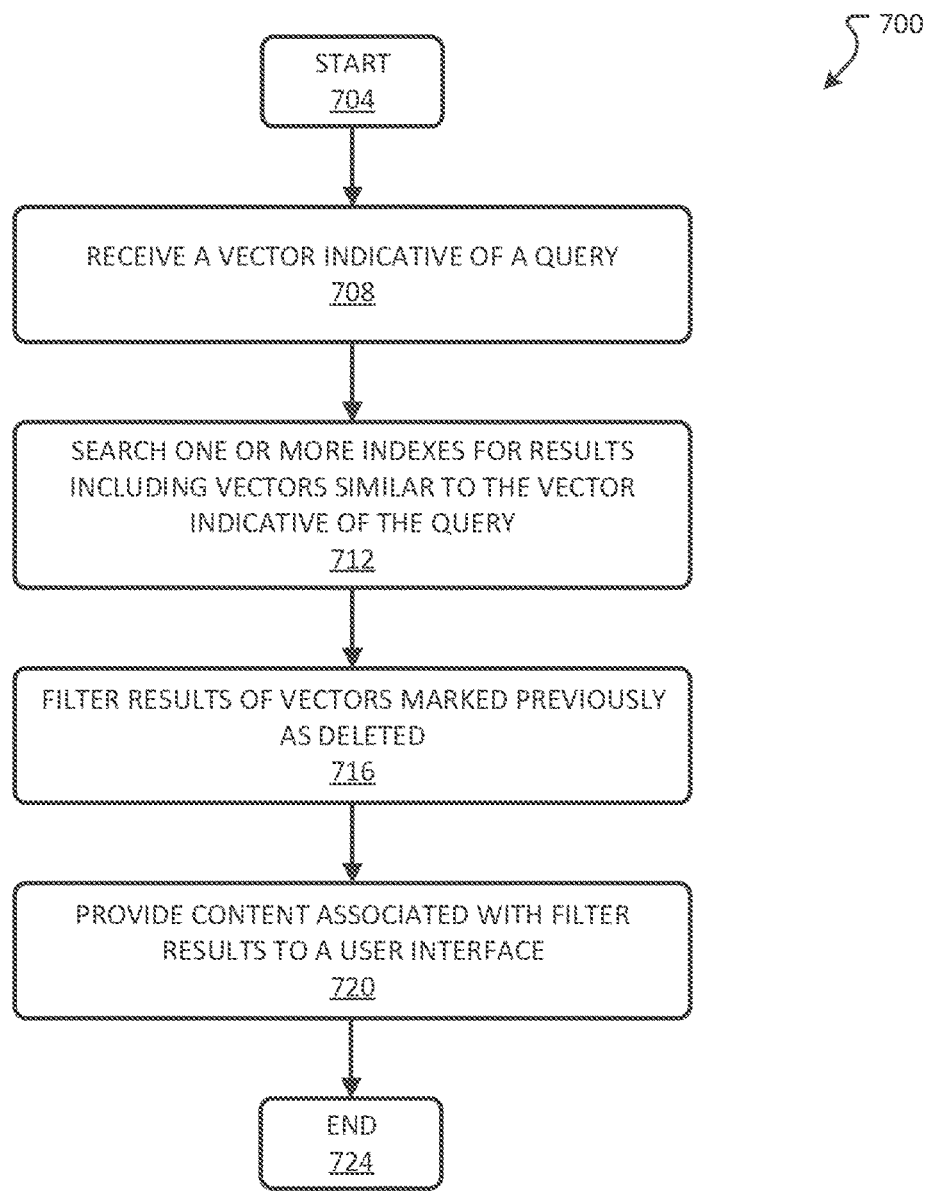
FIG. 7 depicts a third flow chart in accordance with examples of the present disclosure.

FIG. 7 depicts details of a method 700 for returning results from a search index based on a query in accordance with examples of the present disclosure. A general order for the steps of the method 700 is shown in FIG. 7. Generally, the method 700 starts at 704 and ends at 724. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method starts at 704, where flow may proceed to 708. At 708, a vector representative of a query may be received. For example, the query may correspond to user provided keywords or an image. A deep learning model may be applied to the query to generate a vector indicative of the query. At 712, one or more indexes may be searched for vectors most similar to the vector indicative of the query and the vectors, or nodes, most similar to the vector indicative of the query may be identified. At 716, the vectors, or nodes, most similar to the vector indicative of the query may be filtered out or removed based on an identification or indication indicating that the vectors, or nodes, were previously marked as to be deleted. At 720, content associated with the filtered results may be provided to a user interface. The method 700 may end at 724.

Figure 8:
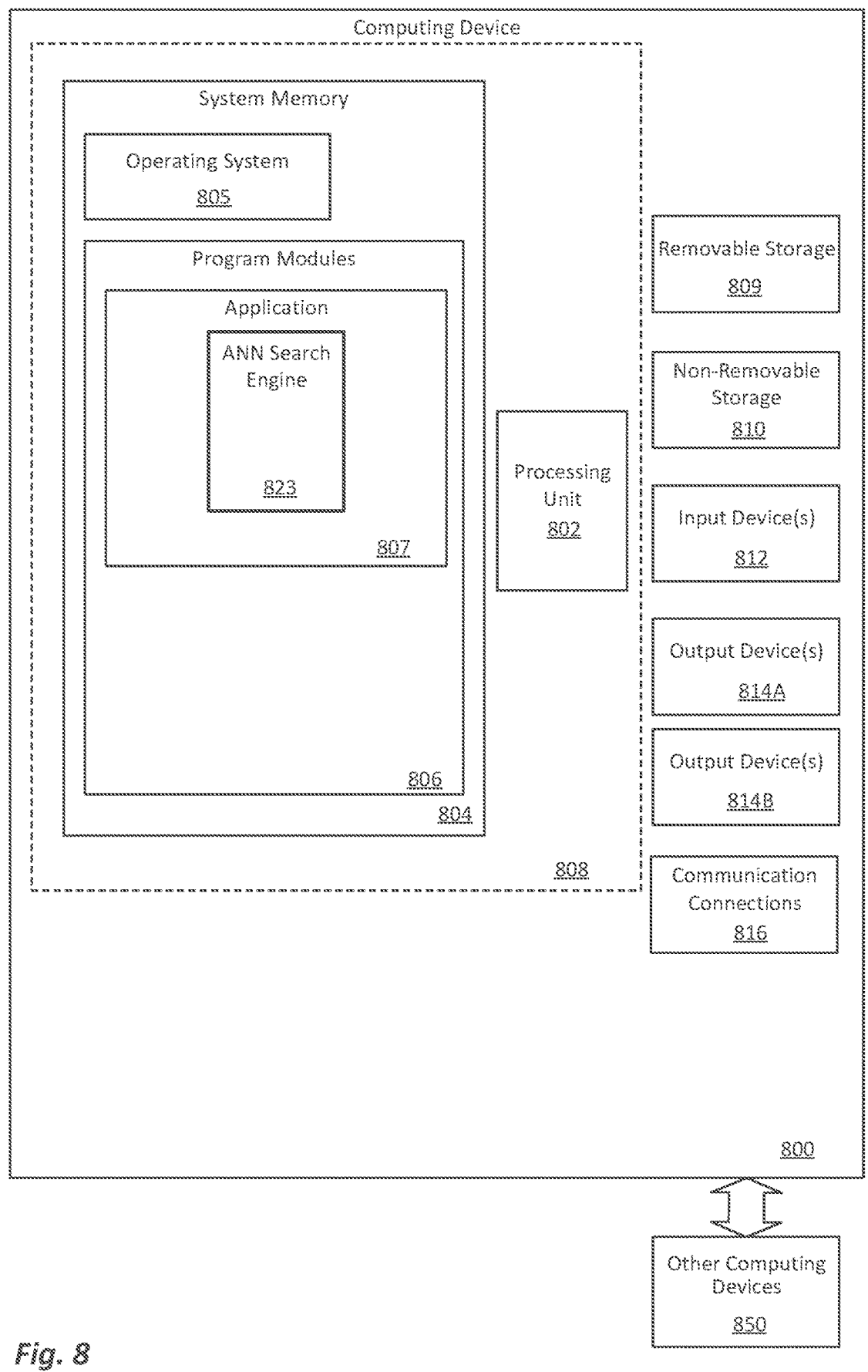
FIG. 8 depicts a block diagram illustrating physical components of a computing device with which aspects of the disclosure may be practiced.
Figure 9A:
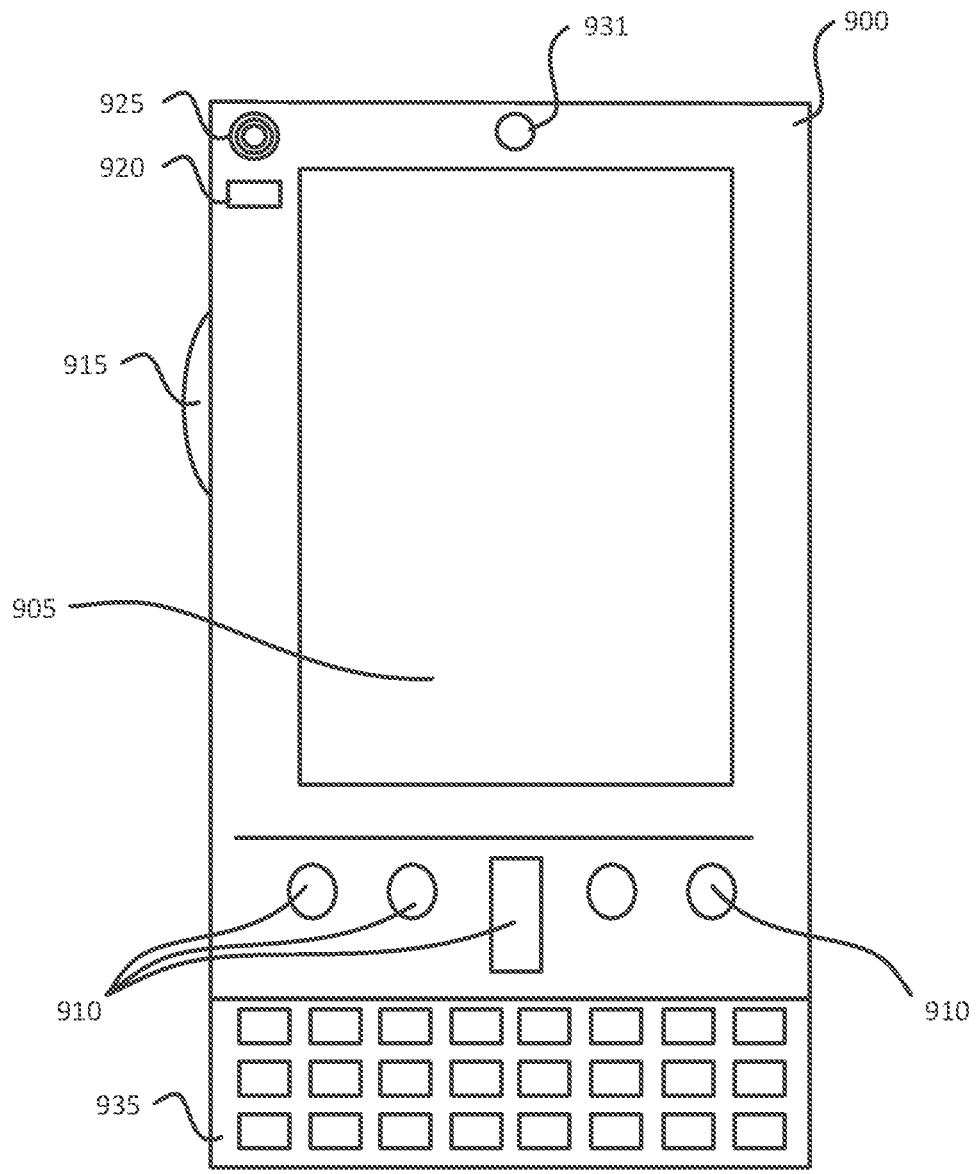
FIG. 9A illustrates a first example of a computing device with which aspects of the disclosure may be practiced.
Figure 9B:
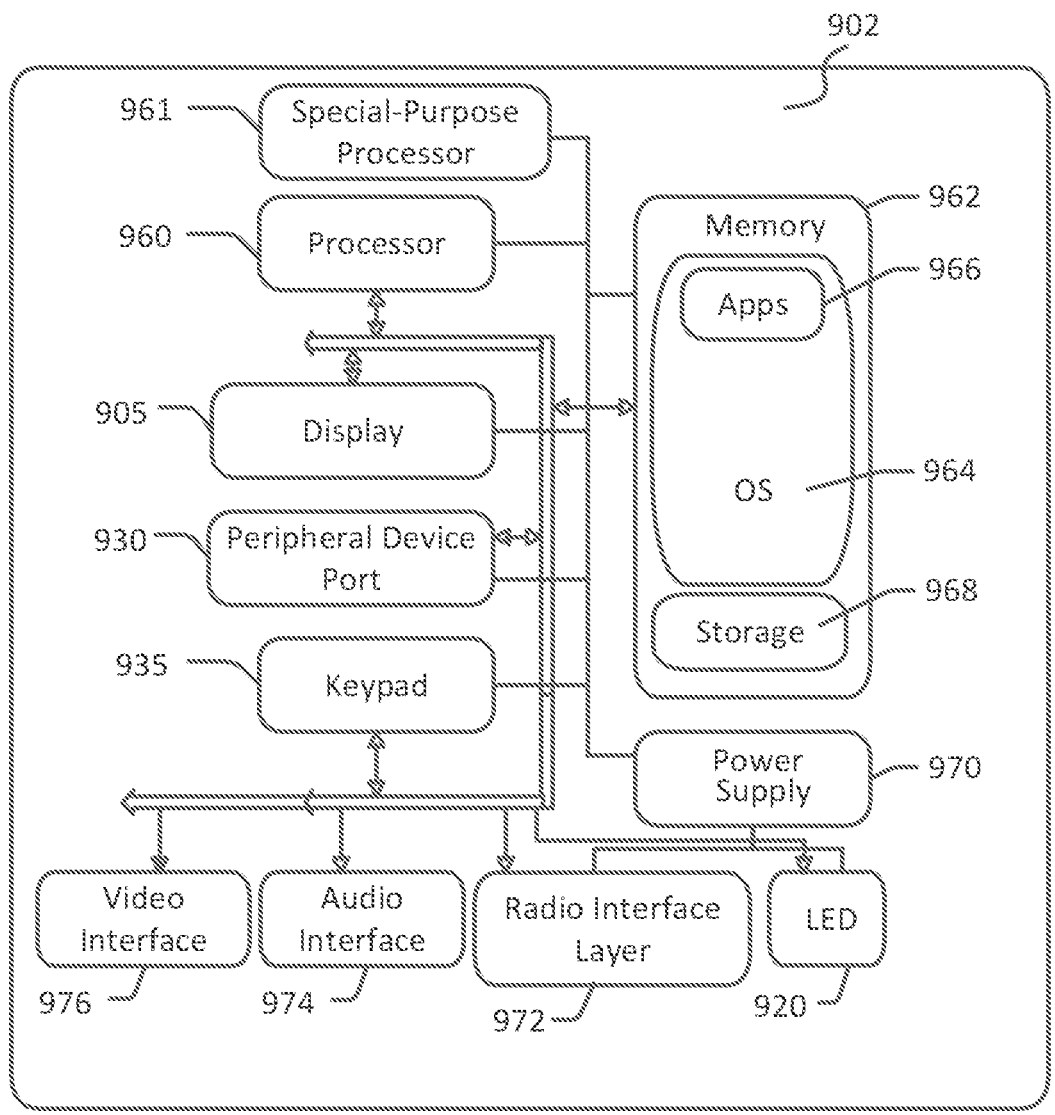
FIG. 9B illustrates a second example of a computing device with which aspects of the disclosure may be practiced.
Figure 10:
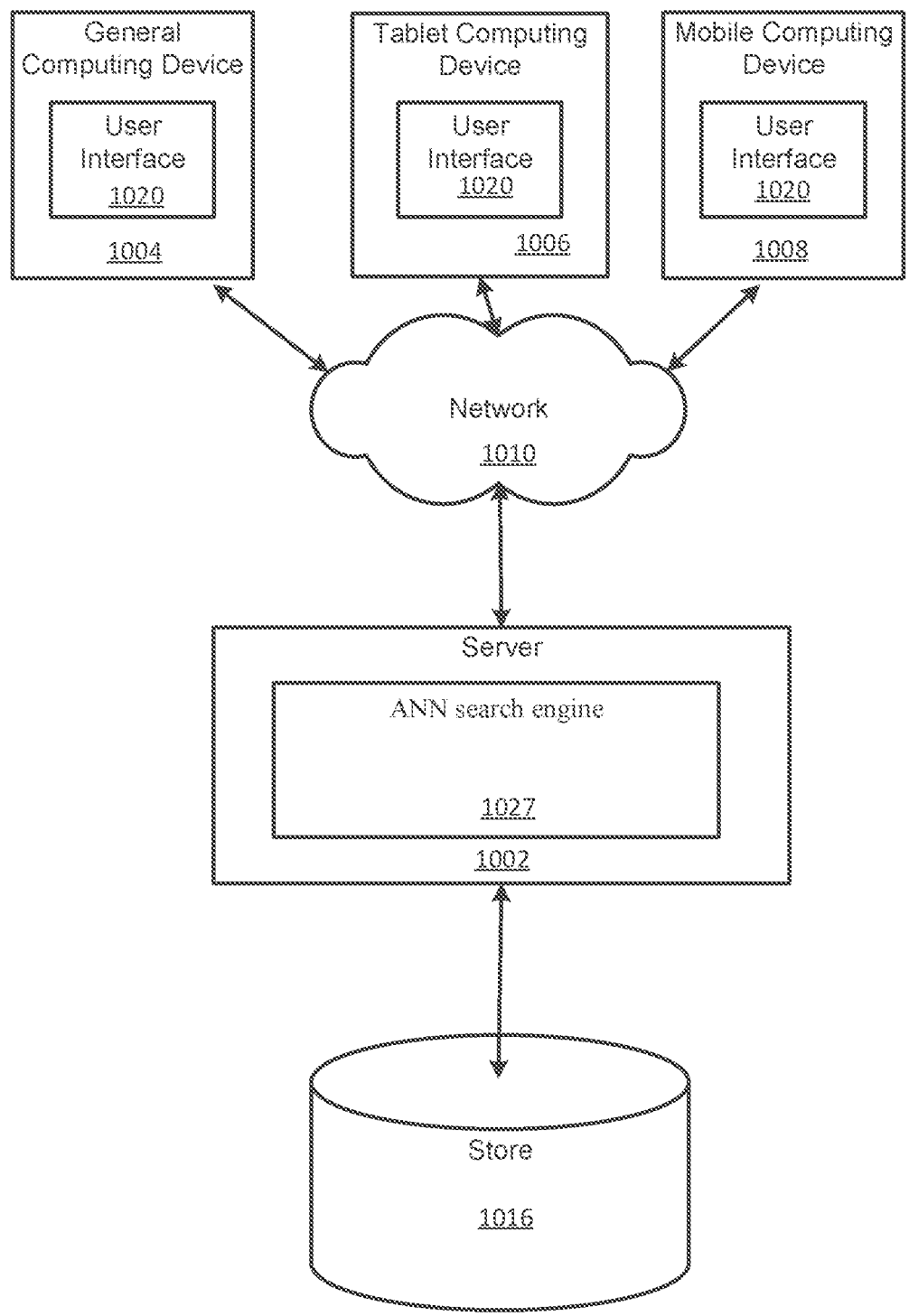
FIG. 10 illustrates at least one aspect of an architecture of a system for processing data in accordance with examples of the present disclosure.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of computing device configurations that may be utilized for practicing aspects of the disclosure, described herein.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software applications 820, such as but not limited to an approximate nearest neighbor (ANN) search engine 823 and/or one or more components supported by the systems described herein. For example, the ANN search engine may receive content to be added, deleted, or searched as described with respect to, but not limited to, at least FIGS. 1-7 of the present disclosure. The operating system 805, for example, may be suitable for controlling the operation of the computing device 800.

Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the at least one processing unit 802, the program modules 806 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814A such as a display, speakers, a printer, etc. may also be included. An output 814B, corresponding to a virtual display may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 931 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external source.

FIG. 9B is a block diagram illustrating the architecture of one aspect of computing device, a server, or a mobile computing device. That is, the computing device 900 can incorporate a system 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and/or one or more components supported by the systems described herein. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g. at least a portion of the approximate nearest neighbor (ANN) search engine 823 etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 402 may be stored locally on the mobile computing device 900, as described above, or the data may be stored on any number of storage media that may be accessed by the device via the radio interface layer 972 or via a wired connection between the mobile computing device 400 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types.

A user interface associated with the approximate nearest neighbor (ANN) search engine 160 and/or 823 and/or one or more components supported by the systems described herein may be employed by a client that communicates with server device 1002. In some aspects, the ANN search engine 160 and/or 823 may be employed by server device 1002 as 1027. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system. The store 1016 may refer to, one or more of the storage locations, such as the object store 220.

FIG. 10 illustrates an exemplary mobile computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection. (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In accordance with at least one example of the present disclosure, a method is provided. The method may include receiving a vector semantically representing content to be added to a search index, identifying a plurality of nodes within the search index determined to be most semantically similar to the received vector, adding a node corresponding to the received vector to the search index, and updating a listing of nearest neighbors associated with each of the of the plurality of nodes to include an identifier associated with the added node.

At least one aspect of the above method includes locking one or more of the plurality of nodes within the search index determined to be most semantically similar to the received vector without locking other nodes in the search index. At least one aspect of the above method includes locating a node within the search index associated with content that is to be deleted, associating an identifier with the located node, the identifier indicating that the located node is to be deleted. At least one aspect of the above method includes receiving a search query from a requesting entity; identifying results including one or more nodes from within the search index that are most semantically similar to a vector representation of the search query, the one or more nodes include the node having the identifier indicating that the located node is to be deleted, removing the node having the identifier indicating that the located node is to be deleted from the results, and providing the results without the node having the identifier indicating that the located node is to be deleted to the requesting entity. At least one aspect of the above method includes updating a listing of nearest neighbors associated with the node having the identifier indicating that the located node is to be deleted to include the node corresponding to the received vector to be added to the search index. At least one aspect of the above method includes receiving the vector at a content area, adding the vector to a content area store, and replicating at least one of an operation or a change in data to secondary content areas. At least one aspect of the above method includes receiving, at the search index, the vector from the content store. At least one aspect of the above method includes applying a read only designation to the search index, generating a second search index having a read and write designation, and storing a replica of the search index to a storage location. At least one aspect of the above method includes merging the stored search index with another search index, loading the merged search index with a read only designation, and generating a third search index having a read and write designation. At least one aspect of the above method includes rebuilding the search index utilizing a plurality of vectors in the content area store.

In accordance with examples of the present disclosure, A system is provided. The system may include a processor, memory, the memory including one or more instructions, which when executed by the processor, cause the processor to: receive, at a primary content area including a plurality of vectors semantically representing content in a content repository, a vector semantically representing content to be added to a search index within a primary search index area, the search index including a neighborhood graph having a plurality of nodes, each node of the plurality of nodes associated with content in the content repository; receive, at the search index area, a node associated with the vector semantically representing content to be added to the search index within the primary search index area; identify a plurality of nodes within the search index determined to be most semantically similar to the received vector semantically representing content to be added to the search index; add a node corresponding to the received vector semantically representing content to be added to the search index to the search index; and update a listing of nearest neighbors associated with each of the of the plurality of nodes to include an identifier associated with the added node.

At least one aspect of the above system includes where the instructions cause the processor to lock the identified plurality of nodes within the search index determined to be most semantically similar to the received vector semantically representing content to be added to the search index without locking other nodes in the search index. At least one aspect of the above system includes where the instructions cause the processor to locate a node within the search index that is to be deleted, and associate an identifier with the located node, the identifier indicating that the located node is to be deleted. At least one aspect of the above system includes where the instructions cause the processor to: receive a search query from a requesting entity; identify results including one or more nodes from within the search index that are most semantically similar to a vector representation of the search query, the one or more nodes including the node having the identifier indicating that the located node is to be deleted; remove the node having the identifier indicating that the located node is to be deleted from the results; and provide the results without the node having the identifier indicating that the located node is to be deleted to the requesting entity. At least one example of the above system includes where the instruction cause the processor to update a listing of nearest neighbors associated with the node having the identifier indicating that the located node is to be deleted to include the node in the search index that is associated with the vector semantically representing content to be added to the search index within the primary search index area representing the received content.

In accordance with at least one example of the present disclosure, a computer-readable medium is provided. The computer-readable medium may include instructions, which when executed by a processor, cause the processor to: receive content, generate a vector semantically representing the received content, locate a plurality of nodes within a neighborhood graph, and update a listing of nearest neighbors associated with each of the plurality of nodes to include an identifier of a node in the neighborhood graph that is associated with the vector semantically representing the received content.

At least one aspect of the above method includes wherein when executed by the processor, the instructions cause the processor to lock the located plurality of nodes within the neighborhood graph without locking other nodes in the neighborhood graph. At least one aspect of the above method includes wherein when executed by the processor, the instructions cause the processor locate a node within the neighborhood graph that is to be deleted, and associate an identifier with the located node, the identifier indicating that the located node is to be deleted. At least one aspect of the above method includes wherein when executed by the processor, the instructions cause the processor to receive a search query from a requesting entity, identify results including one or more nodes from within the neighborhood graph that are most semantically similar to a vector representation of the search query, the one or more nodes including the node having the identifier indicating that the located node is to be deleted, remove the node having the identifier indicating that the located node is to be deleted from the results, and provide the results without the node having the identifier indicating that the located node is to be deleted to the requesting entity. At least one aspect of the above method includes wherein when executed by the processor, the instructions cause the processor to update a listing of nearest neighbors associated with the node having the identifier indicating that the located node is to be deleted to include the node in the neighborhood graph that is associated with the vector semantically representing the received content.

The disclosure is not limited to standards and protocols if described. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method comprising:
receiving a vector semantically representing content to be added to a search index;
identifying a plurality of nodes within the search index determined to be most semantically similar to the received vector;
generating a node based on the received vector, wherein the node comprises the vector semantically representing content to be added to the search index;
locking, for a predetermined time, the node with a fine-grain lock without locking other nodes in the search index, such that the other nodes are searchable during the predetermined time;
building edges for the node based on the plurality of nodes determined to be semantically similar to the received vector;
adding the node to the search index; and
updating a listing of nearest neighbors associated with each node of the plurality of nodes to include an identifier associated with the added node, wherein each node of the plurality of nodes maintains a separate listing of nearest neighbors,
wherein the predetermined time corresponds to the updating the listing of nearest neighbors associated with each node of the plurality of nodes.

2. The method of claim 1, further comprising:
locating a node within the search index associated with content that is to be deleted; and
associating an identifier with the located node, the identifier indicating that the located node is to be deleted.

3. The method of claim 2, further comprising:
receiving a search query from a requesting entity;
identifying results including one or more nodes from within the search index that are most semantically similar to a vector representation of the search query, the one or more nodes including the node having the identifier indicating that the located node is to be deleted;
removing the node having the identifier indicating that the located node is to be deleted from the results; and
providing the results without the node having the identifier indicating that the located node is to be deleted to the requesting entity.

4. The method of claim 2, further comprising updating a listing of nearest neighbors associated with the node having the identifier indicating that the located node is to be deleted to include the node corresponding to the received vector to be added to the search index.

5. The method of claim 1, further comprising:
receiving the vector at a content area;
adding the vector to a content area store; and
replicating at least one of an operation or a change in data to secondary content areas.

6. The method of claim 5, further comprising:
receiving, at the search index, the vector from the content store.

7. The method of claim 1, further comprising:
applying a read only designation to the search index;
generating a second search index having a read and write designation; and
storing a replica of the search index to a storage location.

8. The method of claim 7, further comprising:
merging the stored search index with another search index;
loading the merged search index with a read only designation; and
generating a third search index having a read and write designation.

9. The method of claim 5, further comprising:
rebuilding the search index utilizing a plurality of vectors in the content area store.

10. A system comprising:
a processor; and
memory, the memory including one or more instructions, which when executed by the processor, cause the processor to:
receive, at a primary content area including a plurality of vectors semantically representing content in a content repository, a vector semantically representing content to be added to a search index within a primary search index area, the search index including a neighborhood graph having a plurality of nodes, each node of the plurality of nodes associated with content in the content repository;
receive, at the search index area, a node associated with the vector semantically representing content to be added to the search index within the primary search index area;
identify a plurality of nodes within the search index determined to be most semantically similar to the received vector semantically representing content to be added to the search index;
generate a node based on the received vector, wherein the node comprises the vector semantically representing content to be added to the search index;
lock, for a predetermined time, the node with a fine-grain lock without locking other nodes in the search index, such that the other nodes are searchable during the predetermined time;
build edges for the node based on the plurality of nodes determined to be semantically similar to the received vector;
add node to the search index; and
update a listing of nearest neighbors associated with each node of the plurality of nodes to include an identifier associated with the added node, wherein each node of the plurality of nodes maintains a separate listing of nearest neighbors, and
wherein the predetermined time corresponds to the instructions to update the listing of nearest neighbors associated with each node of the plurality of nodes.

11. The system of claim 10, wherein the instructions cause the processor to:
locate a node within the search index that is to be deleted; and
associate an identifier with the located node, the identifier indicating that the located node is to be deleted.

12. The system of claim 11, wherein the instructions cause the processor to:
receive a search query from a requesting entity;
identify results including one or more nodes from within the search index that are most semantically similar to a vector representation of the search query, the one or more nodes including the node having the identifier indicating that the located node is to be deleted;
remove the node having the identifier indicating that the located node is to be deleted from the results; and
provide the results without the node having the identifier indicating that the located node is to be deleted to the requesting entity.

13. The system of claim 11, wherein the instructions cause the processor to:
update a listing of nearest neighbors associated with the node having the identifier indicating that the located node is to be deleted to include the node in the search index that is associated with the vector semantically representing content to be added to the search index within the primary search index area representing the received content.

14. A computer-readable medium including instructions, which when executed by a processor, cause the processor to:
receive content;
generate a vector semantically representing the received content;
locate a plurality of nodes within a neighborhood graph;
generate a node based on the received vector, wherein the node comprises the vector semantically representing content to be added to a search index;
lock, for a predetermined time, the node with a fine-grain lock without locking other nodes in the search index, such that the other nodes are searchable during the predetermined time;
build edges for the node based on the plurality of nodes determined to be semantically similar to the received vector;
add the node to the search index; and
update a listing of nearest neighbors associated with each node of the plurality of nodes to include an identifier associated with the added node, wherein each node of the plurality of nodes maintains a separate listing of nearest neighbors, and
wherein the predetermined time corresponds to the instructions to update the listing of nearest neighbors associated with each node of the plurality of nodes.

15. The computer-readable medium of claim 14, wherein when executed by the processor, the instructions cause the processor to:
locate a node within the neighborhood graph that is to be deleted; and
associate an identifier with the located node, the identifier indicating that the located node is to be deleted.

16. The computer-readable medium of claim 15, wherein when executed by the processor, the instructions cause the processor to:
receive a search query from a requesting entity;
identify results including one or more nodes from within the neighborhood graph that are most semantically similar to a vector representation of the search query, the one or more nodes including the node having the identifier indicating that the located node is to be deleted;
remove the node having the identifier indicating that the located node is to be deleted from the results; and
provide the results without the node having the identifier indicating that the located node is to be deleted to the requesting entity.

17. The computer-readable medium of claim 15, wherein when executed by the processor, the instructions cause the processor to:
update a listing of nearest neighbors associated with the node having the identifier indicating that the located node is to be deleted to include the node in the neighborhood graph that is associated with the vector semantically representing the received content.

* * * * *